UNITED STATES PATENT OFFICE.

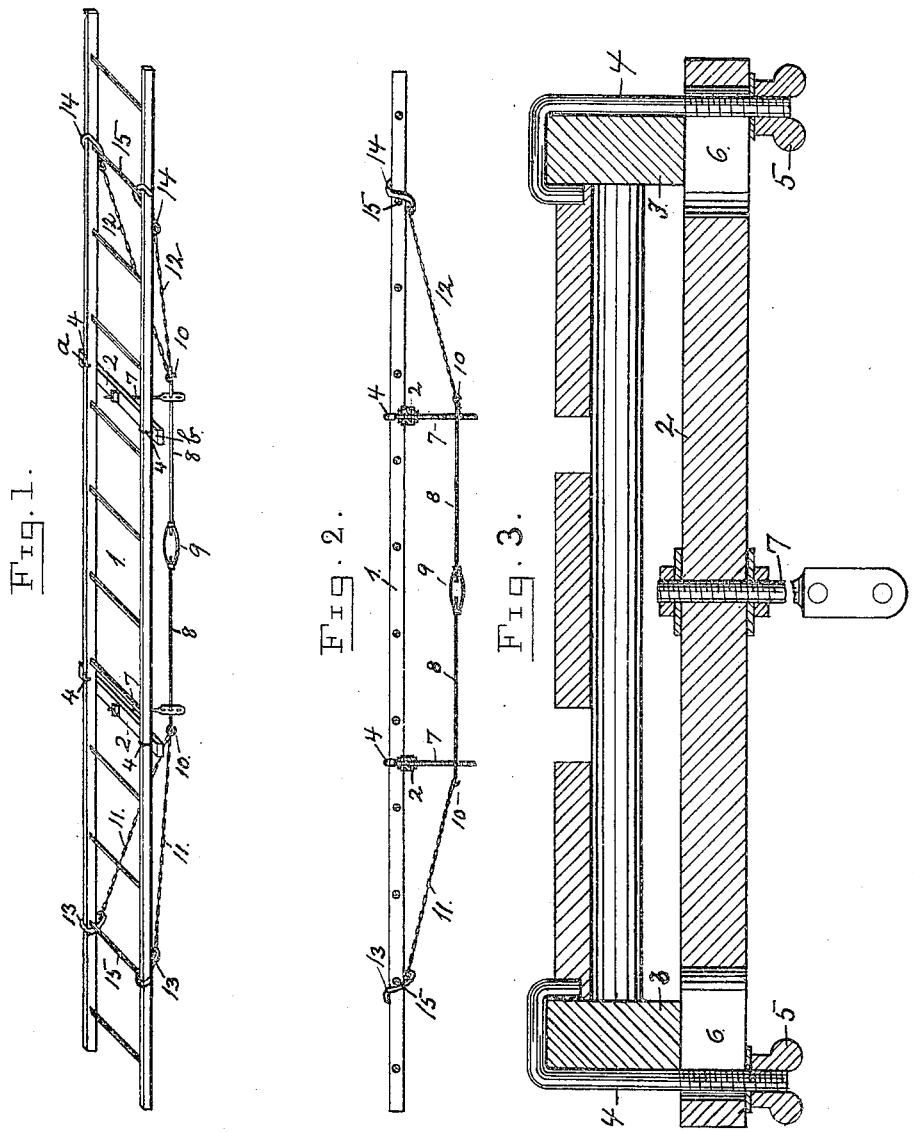

FERDINAND LEHMANN, OF OMAHA, NEBRASKA.

ADJUSTABLE SAFETY SWINGING STAGE AND SCAFFOLD ATTACHMENT.

No. 808,161.　　　Specification of Letters Patent.　　　Patented Dec. 26, 1905.

Application filed September 17, 1904. Serial No. 224,931.

*To all whom it may concern:*

Be it known that I, FERDINAND LEHMANN, a citizen of the United States, residing at Omaha, in the county of Douglas and State of Nebraska, have made a new and useful invention in Adjustable Safety Swinging Stage and Scaffold Attachments, of which the following is a specification.

The object of my invention is to provide an adjustable attachment which can be applied to any kind of stage or ladder and render the same absolutely strong and safe. I attain this object by the mechanism illustrated in the accompanying drawings, in which—

Figure 1 is a perspective view of a stage provided with my attachment; Fig. 2, a vertical longitudinal section on the center line of Fig. 1; and Fig. 3, a cross-section on line *a b*, which also shows boards which have to be placed on stage to make platform complete.

Similar numerals refer to similar parts throughout the several views.

The stage or ladder 1, which has to be made inflexible and safe, constitutes, of course, the framework for carrying my attachment, which consists of two cross-bars 2 2, attached to the side pieces 3 3 of the stage by help of two hooks 4 4, thrown over the upper surface of the sides 3 3 and fastened to the cross-bar by the thumb-nuts 5 5.

The holes 6 6 in the cross-bars 2 2 for the hooks 4 4 to pass are shaped oblong to allow the cross-bars to be fastened to stages of different width between their legs or sides.

At the center of the cross-bars 2 2 bolts 7 7 are fastened solidly between two nuts and their washer, as plainly shown in Fig. 3.

The lower end of the bolt 7 is flattened and provided with a series of holes. In a set of corresponding holes in the two bolts 7 7 fit the two rods 8 8. The inner ends of these two rods are threaded and fitted into the ends of a turnbuckle 9. The outer ends of the rods are shaped in hooks 10 10, to which is to be hooked the one end of the respective chains 11 11 and 12 12. The other ends of these chains are hooked to their respective hooks 13 13 and 14 14, which again are hooked over the upper edges of the sides or legs 1 1 of the stage; but first they have been passed under the respective steps or rungs 15 15 to prevent them from sliding on the respective sides of the stage.

When it is wanted to attach my arrangement to any stage or ladder, then I first attach the two cross-bars 2 2, to which already are attached the two bolts 7 7, to the sides of the stage, as mentioned above. Then I arrange the rods 8 8 in their suitable holes in the lower end of the bolts and connect the rods with the turnbuckle. Now I place the hooks 13 13 and 14 14 on their respective places and fasten a suitable link of the other end of the chains in the hooks of the rods 8 8, and then by help of the turnbuckle I can tighten up the whole mechanism to any suitable tension. The horizontal position is considered to be the right one.

Having thus described my invention, what I claim, and desire to secure by Letters Patent, is—

1. In an adjustable attachment for making swinging stages and scaffolds safe, the combination with adjustable cross-bars, of tension-rods provided with turnbuckle and hooks, of chains hooked onto the tension-rods and carrying at the other end, hooks or clasps to be fastened to the stage or ladder, of bridge-bolts fastened in the center of the cross-bars, through which pass the tension-rods, substantially as set forth.

2. In an adjustable attachment for making swinging stages and scaffolds safe, the combination with adjustable cross-bars, of tension-rods provided with turnbuckle and hooks, of chains hooked onto the tension-rods and carrying at their other end, hooks or clasps to be fastened to the stage or ladder, of bridge-bolts fastened in the center of the cross-bars, through which pass the tension-rods, and of hook-bolts with thumb-nuts, passing through each end of the cross-bars, and serving as fastenings for the cross-bars to the stage or ladder substantially as set forth.

FERDINAND LEHMANN.

Witnesses:
　O. C. OLSEN,
　SALMA ISMUSSEN.